(12) United States Patent
Brandon-Jones et al.

(10) Patent No.: US 8,739,812 B2
(45) Date of Patent: Jun. 3, 2014

(54) ROTARY SUPPLY JOINT, ROTARY TIMING VALVE AND PRODUCT HANDLING APPARATUS

(75) Inventors: Julian Brandon-Jones, Royston (GB); Nigel David Harrison, Royston (GB)

(73) Assignee: Capsugel Belgium NV, Bornem (BE)

( * ) Notice: Subject to any disclaimer, the term of this patent is extended or adjusted under 35 U.S.C. 154(b) by 598 days.

(21) Appl. No.: 13/122,180

(22) PCT Filed: Sep. 30, 2009

(86) PCT No.: PCT/IB2009/054272
§ 371 (c)(1),
(2), (4) Date: Jun. 10, 2011

(87) PCT Pub. No.: WO2010/038199
PCT Pub. Date: Apr. 8, 2010

(65) Prior Publication Data
US 2011/0232790 A1      Sep. 29, 2011

Related U.S. Application Data

(60) Provisional application No. 61/102,043, filed on Oct. 2, 2008.

(51) Int. Cl.
*F16K 11/074* (2006.01)
*F16C 32/06* (2006.01)

(52) U.S. Cl.
USPC .............. 137/246.11; 137/625.46; 277/431; 384/123

(58) Field of Classification Search
USPC ........... 137/246.11, 625.42, 625.46; 277/431; 384/121–124
See application file for complete search history.

(56) References Cited

U.S. PATENT DOCUMENTS

| 4,586,830 | A | 5/1986 | Carter |
| 5,316,042 | A | 5/1994 | Lim et al. |
| 5,901,737 | A | 5/1999 | Yaron ................ 137/246.12 |
| 5,913,329 | A | 6/1999 | Haynes et al. |
| 6,053,203 | A | 4/2000 | Sailor et al. ............. 137/624.13 |
| 6,126,169 | A | 10/2000 | Sogard et al. |
| 6,431,202 | B1 | 8/2002 | Ahlgren et al. |
| 2006/0090477 | A1 | 5/2006 | Rolff ..................... 62/6 |
| 2006/0107569 | A1 | 5/2006 | Kolodziejczak ............. 40/591 |

FOREIGN PATENT DOCUMENTS

| EP | 0611961 | 8/1994 | ......... G01N 1/00 |
| SU | 1520260 A1 | 11/1989 | |
| WO | WO 2004053331 | 6/2004 | ......... F04B 27/04 |
| WO | WO 2006075981 | 7/2006 | ......... F25B 9/00 |
| WO | WO 2007101416 | 9/2007 | ......... F16H 61/02 |

OTHER PUBLICATIONS

WO2004/053331 English equivalent US 2006/090477.
WO2007/101416 English equivalent US 2009/107569.
International Search Report for PCT/IB2009/054272, WO2010/038199, three pages, dated Dec. 28, 2009.

(Continued)

*Primary Examiner* — John Fox
(74) *Attorney, Agent, or Firm* — Klarquist Sparkman, LLP

(57) ABSTRACT

A rotary supply joint that may, in particular be a rotary timing valve, is provided for providing fluid flow at least periodically from inlet ports to outlet ports when respective openings in first and second surfaces which are rotating relative to each other are aligned, in which a gas bearing is arranged to provide a bearing force between the first and second surfaces.

11 Claims, 3 Drawing Sheets

(56) References Cited

OTHER PUBLICATIONS

Written Opinion of the International Searching Authority for PCT/IB2009/054272, WO2010/038199, six pages, dated Dec. 28, 2009.
Office Action for related Canadian Patent Application No. 2,737,034, 2 pages, Dec. 17, 2013.
Office Action for related Mexican Patent Application No. MX/a/2011/003559, 7 pages, Jan. 27, 2014.
Office Action for related Chinese Patent Application No. 200980138844.X, 14 pages, Feb. 17, 2014.

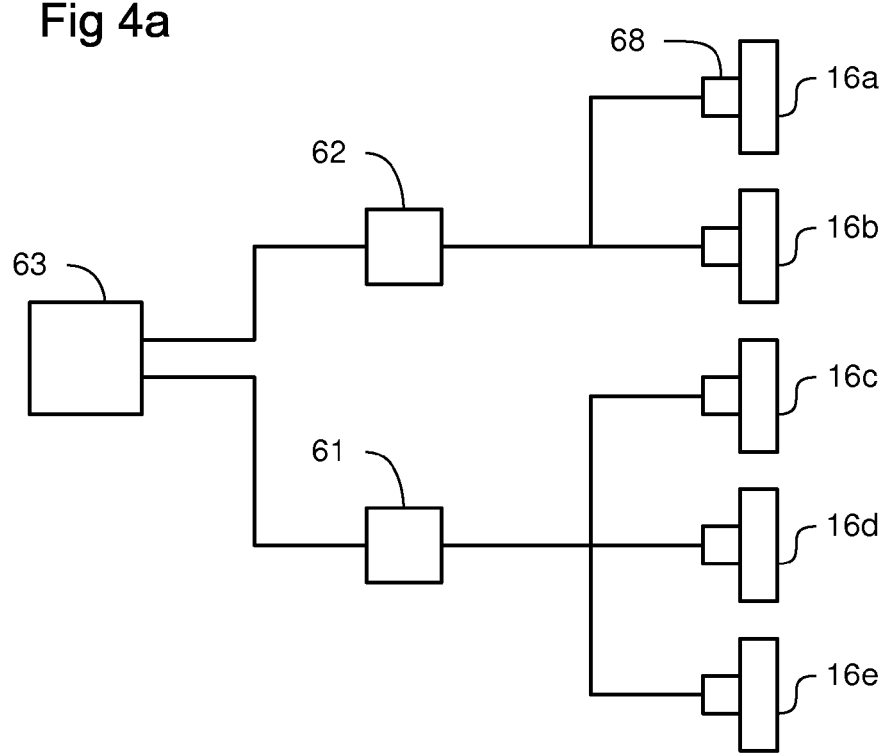
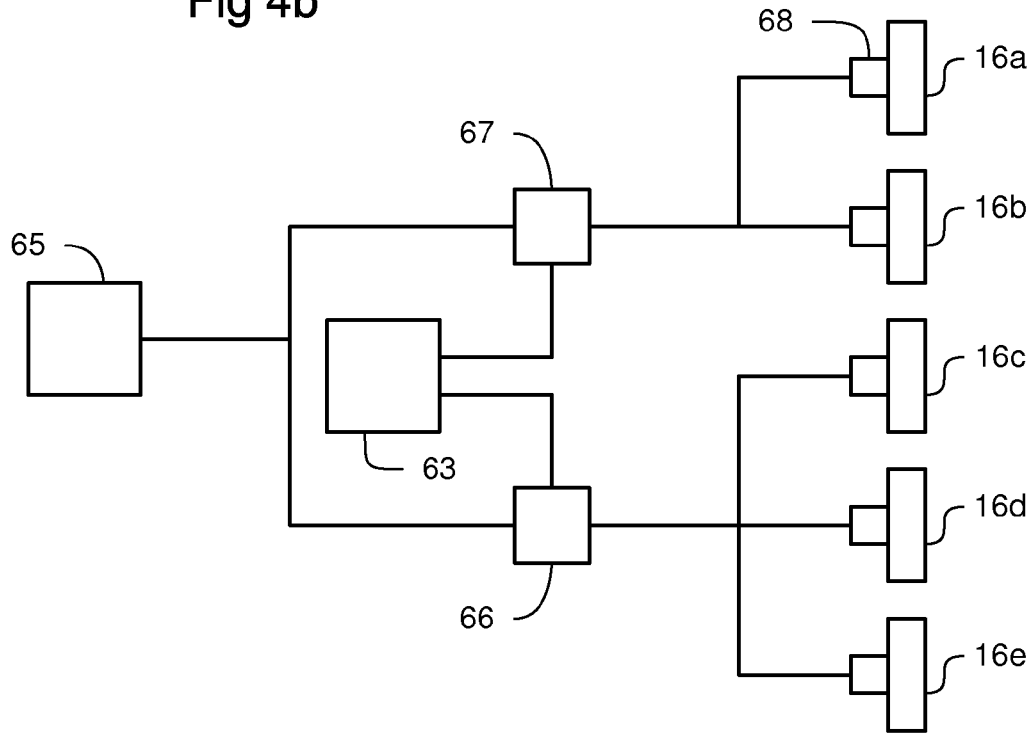

ROTARY SUPPLY JOINT, ROTARY TIMING VALVE AND PRODUCT HANDLING APPARATUS

This application is a National Stage filing of PCT/IB2009/054272 filed Sep. 30, 2009, which claims priority to U.S. Provisional Patent Application No. 61/102,043 filed Oct. 2, 2008, the disclosures of which are hereby incorporated by reference in its entirety.

The present invention relates to rotary supply joints and, in particular to rotary timing valves, and product handling apparatus including such a rotary supply joint.

In a rotary timing valve, two surfaces are provided and rotate relative to each other. Each surface is provided with openings and the rotary timing valve is configured such that, as the surfaces rotate relative to each other, an opening on one surface is periodically aligned with an opening on the other surface. During a period of alignment, fluid may flow from one opening to the other, namely from one surface to the other but, when the openings are not aligned, such fluid flow may be prevented. Accordingly, the speed of relative rotation and the arrangement of the openings may be selected to provide a desired timing of flow between openings. In general, the openings may be arranged such that an opening on one surface is always aligned with an opening on the other surface. Accordingly, a rotary supply joint may provide a connection for fluid flow between a component associated with one surface and a component associated with the other surface while one is rotating relative to the other.

In general, two forms of rotary timing valve are known. A first form is cylindrical rotary timing valves, in which the two surfaces are cylindrical in shape, one nested inside the other. However, cylindrical rotary timing values are difficult to manufacture and, accordingly, expensive because it requires very precise control of two matching cylindrical surfaces. Furthermore, they are expensive to maintain because of the requirement to maintain the matching of the surfaces in use, which may, for example, be difficult due to expansion of the components.

A second form of rotary timing valve is flat-face rotary timing valves, in which the surfaces are flat and one rotates relative to the other about an axis perpendicular to the surfaces. Such rotary timing valves are easier to form because it is easier to produce flat surfaces. However in order to avoid leakage of the fluid being switched by the rotary timing valve, it is essential for the two surfaces to be very close together, if not in contact. Accordingly, friction may be a problem, resulting in, for example, high wear rates, frictional heat generation, higher power consumption which may require larger motors for driving the relative rotation of the surfaces, the use of more expensive materials and/or a limited life.

It will be appreciated that similar issues to those described above apply more generally to rotary supply joints.

In some instances, if the fluid being supplied by a rotary supply joint or switched by the rotary timing valve in particular is a liquid, the liquid may act as a lubricant. However, this is not always appropriate and, in other situations, the fluid being supplied or switched may not be a liquid. For example, it may be desirable to be able to use a rotary supply joint to supply (or a rotary timing valve to switch) an under-pressure source, for example a connection to a vacuum pump. However, use of the rotary supply joint to supply (or a rotary timing valve to switch) an under-pressure source results in an additional force driving the two surfaces together, exacerbating the frictional problems discussed above.

Accordingly, it an aim of the present invention to provide a rotary supply joint that at least partially overcomes some of the difficulties discussed above.

According to the present invention there is provided a rotary supply joint, having one or more outlet ports and one or more inlet ports configured to provide a connection for fluid flow between the one or more outlet ports and the one or more inlet ports, the rotary supply joint including:
  first and second surfaces, configured to rotate relative to each other and to have corresponding shapes such that, during relative rotation of the first and second surfaces, a substantially constant separation may be maintained between the first and second surfaces;
  wherein each of said one or more inlet ports is connected for fluid flow to at least one opening on the first surface;
  each of said one or more outlet ports is connected for fluid flow to at least one opening on the second surface;
  as the first and second surfaces rotate relative to each other, at least one opening on the first surface is at least periodically at least partially aligned with at least one opening on the second surface, permitting a flow of fluid from one to the other; and
  characterised by a gas bearing, provided between the first and second surfaces, configured to provide a bearing force between the first and second surfaces.

The provision of a gas bearing between the first and second surfaces may provide a controlled separation between the surface. Accordingly, the separation may be sufficiently small that any leakage of the fluid being switched is sufficiently small for the required operation of the rotary supply joint. At the same time, the provision of the small separation may greatly reduce the frictional problems caused by the relative motion of the two surfaces. It will be appreciated that in some arrangements, the gas bearing may not actually provide a separation between the two surfaces. However, by providing a bearing force between the first and second surfaces, the contact force between them may be reduced, thereby correspondingly reducing the frictional force acting between the two surfaces. Furthermore, even if the gas bearing does not provide a complete separation between the two surfaces, the gas bearing may provide sufficient gas to the space between the two surfaces that the gas functions as a lubricant between the two surfaces, reducing the friction.

By appropriate arrangement of the openings on the first and second surfaces and their connection to the inlet ports and outlet ports, the rotary supply joint may be used as rotary timing valve, providing a required cycle of connections for fluid flow between the one or more inlet ports and the one or more outlet ports.

Furthermore the use of a gas bearing may be particularly beneficial because it inherently provides a stable separation. In particular, if the separation between the two surfaces reduces for any reason, the bearing force of the gas bearing increases, namely provides a tendency for the separation between the two surfaces to return to the desired level. Likewise, if the separation between the two surfaces increases, the bearing force decreases, resulting in a tendency for the surfaces to move closer together. Accordingly, the separation between the two surfaces remains stable, even if there are fluctuations in other forces acting on the two surfaces.

The rotary supply joint of the present invention may, in particular, be used to supply an under-pressure source, namely a system that has gas at a lower pressure than the ambient environment in which the rotary supply joint operates, for example a vacuum pump.

In this case, the connection of the under-pressure source to at least one of the inlet ports results in a force acting on the two surfaces to drive them together. The greater the pressure difference between the pressure of the gas in the under-pressure source and the ambient gas pressure surrounding the rotary supply joint, the greater the resulting force between the two surfaces. Likewise the greater the effective area over which the under-pressure acts, the greater the force acting on the surfaces. The effective area may correspond to the projected area of the openings on the first surface that are connected to the under-pressure source. However, because the first and second surfaces may be very close together, a pressure gradient may be established, in which the pressure increases from the level of the under-pressure source adjacent to the openings on the first surface up to the ambient level at some distance away from the openings. Accordingly, the effective area is the area that would result in the equivalent force if the pressure in all of that area were at the pressure of the under-pressure source. It should be noted that, as the separation between the first and second surfaces decreases, the pressure gradient changes, increasing the effective area and therefore increasing the bearing force.

In any case, by the appropriate control of the gas bearing, the bearing force provided by the gas bearing may compensate for the force driving the surfaces together as a result of the connection to the under-pressure source in order to maintain the separation. In general, it will be appreciated that the gas bearing may be configured to balance the net force acting on the surfaces to bring them together, including any other forces that may be exerted on the surfaces.

In a particular arrangement, the rotary supply joint may include a mount that supports the elements of the rotary supply joint and enables it to be mounted to another component within a system within which the rotary supply joint is to be used. In this case, the first surface may be supported by the mount such that it does not rotate, enabling convenient connection of any fluid sources to the one or more inlet ports. The second surface may be supported on the mount such that it can rotate relative to the mount, and therefore also the first surface, about an axis of rotation. For example, the second surface may be mounted on a rotary bearing. Accordingly, the required relative rotation of the first and second surfaces, for example to provide the required switching between the inlet and outlet ports of a rotary timing valve, may be provided.

One or both of the second surfaces may be supported on the mount such that the surface can move in a linear direction parallel to the axis of rotation of the second surface, providing adjustment of the separation between the first and second surfaces. In one arrangement, the second surface may be supported on the mount such that it does not move in the direction parallel to its axis of rotation, reducing the complexity of the bearing arrangement for the second surface. In that case, it will be appreciated that the first surface will be supported on the mount such that it can move in the linear direction parallel to the axis of rotation of the second surface but may be prevented from moving in any other direction relative to the mount. In any case, it will be appreciated that the required range of movement in the linear direction parallel to the axis of rotation of the second surface may be relatively small because it need only provide the required range of movement necessary to permit the gas bearing to maintain a stable separation between the two surfaces under the influence of fluctuations in the external forces applied to the surfaces.

The gas bearing may be formed from one or more gas bearing openings provided on one or both of the first and second surfaces and that are connected to a gas supply that provides gas at a pressure that is higher than the ambient pressure of the environment in which the rotary supply joint is operating.

Accordingly, a continual flow of gas is provided from the gas bearing openings and provides the bearing force required. Depending on the requirements of the rotary supply joint, the gas supply may be a compressor that draws in air from around the rotary supply joint and compresses it. Alternatively, for example, it may provide a specific gas or mixture of gasses from a reservoir. The former arrangement may be simpler and less expensive. However, the latter arrangement may be required, for example to provide an inert gas that will not react with, for example, the fluids being supplied by the rotary supply joint.

In a particular arrangement, the gas bearing may have multiple gas bearing openings and the supply of the gas to at least two of the gas bearing openings may be such that the pressure of the gas may be independently controlled. Such an arrangement may permit improved control of the separation of the two surfaces.

For example, such an arrangement may permit different bearing forces to be provided between the two surfaces in different regions of the surfaces. This may be beneficial because the external forces acting on the surfaces may be different in different regions. Such a situation may occur, for example, if the openings in the surfaces in one region are connected to fluid sources having different pressures to those of another region and/or the size of the openings in the surfaces in one region are different from those in another region.

Alternatively or additionally it may be desirable to control the pressure of the gas exhausted from two different gas bearing openings if the gas bearing openings have different sizes, for example due to space restrictions on the surfaces.

The independent pressure control for the two or more gas bearing openings may be provided, for example, by connecting the gas bearing openings to separate gas supplies and/or by providing separate controllable valves in the flow lines to the gas bearing openings.

Each of the gas bearing openings may be connected with a respective gas flow restrictor, for example even if the gas bearing openings are configured to operate at the same pressure. The provision of separate gas flow restrictors for each gas bearing opening, which restricts the gas flow from the gas bearing opening according to the pressure, may improve the stability of the separation between the two surfaces. In particular, in such an arrangement, a change in the separation between the two surfaces at the location of one of the gas bearing openings may not affect the bearing force provided by another gas bearing opening.

In an arrangement such as that described above, in which the first surface is supported by such a mount such that the first surface does not rotate relative to the mount, the one or more gas bearing openings may be provided only on the first surface. Such an arrangement may, in particular, facilitate the supply of gas to the gas bearings.

The one or more gas bearing openings may be provided along a ring surrounding the axis of rotation of the second surface. In particular, the one or more gas bearing openings may be provided at locations that are equidistant from the axis of rotation of the second surface. At least one of the gas bearing openings may be in the form of a channel, or groove, formed in the first surface along at least a part of the ring surrounding the axis of rotation of the second surface. For example, the gas bearing may include a gas bearing opening that includes an annular channel that completely surrounds the axis of rotation of the second surface. The gas bearing may include or more gas bearing openings in the form of channels formed on arcs of the ring surrounding the axis of rotation of the second surface. However, it will also be appreciated that the gas bearing openings may be formed from any convenient shape.

The one or more openings in the first surface that are connected to the one or more inlet ports may have arrangements corresponding to any of those described above for the gas bearing openings.

It will be appreciated, however, that the one or more openings connected to the inlet ports may be provided on one or more different rings from those used for the arrangement of the gas bearing openings in order to avoid one of the openings in the second surface, connected to the outlet ports, becoming aligned with a gas bearing opening during use of the rotary supply joint.

In a particular arrangement, the gas bearing openings may be arranged on a first ring surrounding the axis of rotation of the second surface and the openings in the first surface connected to the one or more inlet ports may be arranged around a second ring. In such an arrangement, the first ring may be arranged at a greater distance from the axis of rotation of the second surface and the second ring. Such an arrangement may be beneficial because it may provide greater space in which to arrange the gas bearing. In addition, by providing the gas bearing openings at a greater distance from the axis of rotation from the second surface, the stability of the rotation of the second surface relative to the first surface may be increased.

The rotary supply joint may be used as part of a product handling apparatus. For example, at least one inlet port of the rotary supply joint may be connected to an under-pressure source and at least one outlet port may be connected to an associated product holder mounted to the second surface. Accordingly, the product holder may be connected for fluid flow at least periodically to the under-pressure source. Such an arrangement may be beneficial because the under-pressure may be used to secure the product to the product holder for movement of the product, for example permitting the product to be rotated with the second surface. This may permit the movement of the product from one part of a process, such as a manufacturing, testing and/or inspecting process, to another part of the process. Alternatively or additionally, it may facilitate the inspection of the product. For example, the product holder may be configured to further rotate relative to the second surface such that the product may be inspected from each side.

The invention will now be described with way of non-limiting examples with reference to the accompanying drawings, in which:

FIGS. 4a and 4b depict possible control systems for an air bearing used in the arrangement depicted in FIGS. 2 and 3.

The present invention is described below in the context of a rotary timing valve 10, namely a rotary supply joint in which the openings on two corresponding surfaces are arranged such that at least one inlet port is periodically connected for fluid flow to at least one outlet port, the inlet and outlet ports being connected to associated openings on the surfaces. However, it will be appreciated that by appropriate arrangement of the openings on the surfaces, a general rotary supply joint can be provided in which, notwithstanding the relative rotation of the first and second surfaces, at least one inlet port is permanently connected for fluid flow to at least one outlet port.

Figure 1:
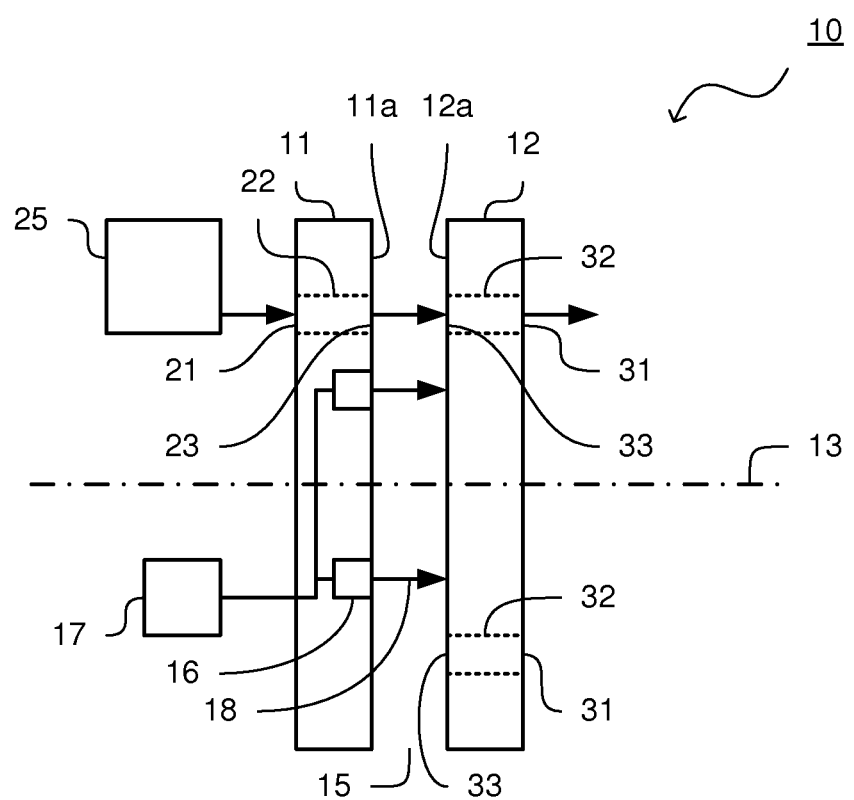
FIG. 1 depicts the general arrangement of a rotary timing valve according to the present invention.

FIG. 1 depicts a schematic arrangement of a rotary timing valve 10 according to the present invention. In the arrangement shown, the rotary timing valve 10 includes a first disc 11 including a first surface 11a and a second disc 12 including a second surface 12a, arranged to be adjacent to the first surface 11a. The second disc 12 is configured such that it may rotate about an axis 13 relative to the position of the first disc 11.

The first disc 11 includes one or more inlet ports 21 connected by passages 22 that permit the flow of fluid to one or more openings 23 on the first surface 11a. Correspondingly, the second disc 12 includes one or more outlet ports 31 connected to passages 32 that permit fluid flow from one or more openings 33 in the second surface 12a.

As the second disc 12 rotates relative to the first disc 11, the openings 23 in the first surface 11a are periodically aligned with the openings 33 in the second surface 12a. As shown in FIG. 1, when an opening 33 in the second surface 12a is at least partially aligned with an opening 23 in the first surface 11a, fluid may flow between the inlet port 21 and the outlet port 31.

The inlet port 21 may be connected to a fluid source 25. Accordingly as the second disc 12 rotates relative to the first disc 11, fluid is periodically provided from the fluid source 25 to the inlet port 21, transferred between the opening 23 on the first surface 11a to the opening 33 on the second surface 12a and thence to the outlet port 31. It will be appreciated, however, that if the fluid source 25 is an under-pressure source, such as vacuum pump, fluid will flow in the opposite direction, namely from the outlet port 31 to the inlet port 21 and thence to the under-pressure source 25.

By appropriate arrangement of the openings 23 on the first surface 11a and to openings 33 on the second surface 12a, a required duty cycle of switching of the connections between the inlet ports 21 and the outlet ports 31 can be provided.

It should be appreciated that any number of inlet ports 21 and outlet ports 31 can be provided and that each may be connected to different fluid sources or, for example, different spaces that are to be periodically connected to the fluid sources by the rotary timing valve.

Likewise, any number of openings 23, 33 may be provided on the first and second surfaces 11a, 12a and a plurality of openings 23, 33 may be connected to any one of the inlet ports 21 and outlet ports 31, respectively. It should also be appreciated that the duty cycle of the rotary timing valve 10 may be configured such that, during one part of duty cycle, an outlet port 31 is connected for fluid flow to one of the inlet ports 21 and, at another part of the duty cycle, is connected for fluid flow to another of the inlet ports 21. It will also be appreciated that during parts of the duty cycle the inlet ports 21 and/or the outlet ports 31 may not be connected for fluid flow to an outlet port 31 or an inlet port 21, respectively.

It should further be appreciated that although the rotary timing valve 10 depicted in FIG. 1 includes first and second discs 11, 12 the invention does not require the use of discs. Accordingly, alternative shape of components may be used, provided that they include, respectively, a first surface 11a and a second surface 12a that may be arranged adjacent to each other.

Furthermore, although the surfaces 11a, 12a depicted in FIG. 1 are flat, this is not essential. However, the first surface 11a and the second surface 12a should have corresponding shapes and be arranged such that as the second surface 12a rotates relative to the first surface 11a about the axis of rotation 13, the separation between the two surfaces 11a, 12a can remain constant. For example, the first and second surfaces may be conical, resulting in a conical timing valve. Flat surfaces may nevertheless be preferable because they are easier to form accurately.

As depicted in FIG. 1, a separation is maintained between the first and second surfaces 11a, 12a. This reduces the friction between the first and second surfaces 11a, 12a. It will be appreciated that FIG. 1 is schematic and that the gap 15 shown between the first and second surfaces 11a, 12a is not to scale. In particular, the gap between the first and second surfaces 11a, 12a may be very small in order to minimize the leakage of fluid.

As shown, the rotary timing valve 10 of the present invention includes a gas bearing that maintains the separation 15 between the first surface 11 a and the second surface 12a. The gas bearing includes one or more gas bearing openings 16 that are provided with gas by a gas supply 17 and provide a flow of gas 18 that provides the bearing force.

It should be appreciated that any number of gas bearing openings 16 may be utilized, as discussed further below. Likewise, it should be appreciated that a variety of different gas sources 17 may be utilized. In particular, the gas source 17 may be a compressor that draws in gas, such as air, from the environment surrounding the rotary timing valve 10 and compresses it to provide gas under pressure to the gas bearing opening 16. Alternatively or additionally, the gas source 17 may include a reservoir of gas that contains a specific gas or mixture of gases that are provided to the gas bearing openings 16. For example, the gas supply 17 may provide an inert gas. In any case, the gas supply 17 may include a filter to ensure that no particulates are passed into the gas bearing which may cause blockages.

Figure 2:
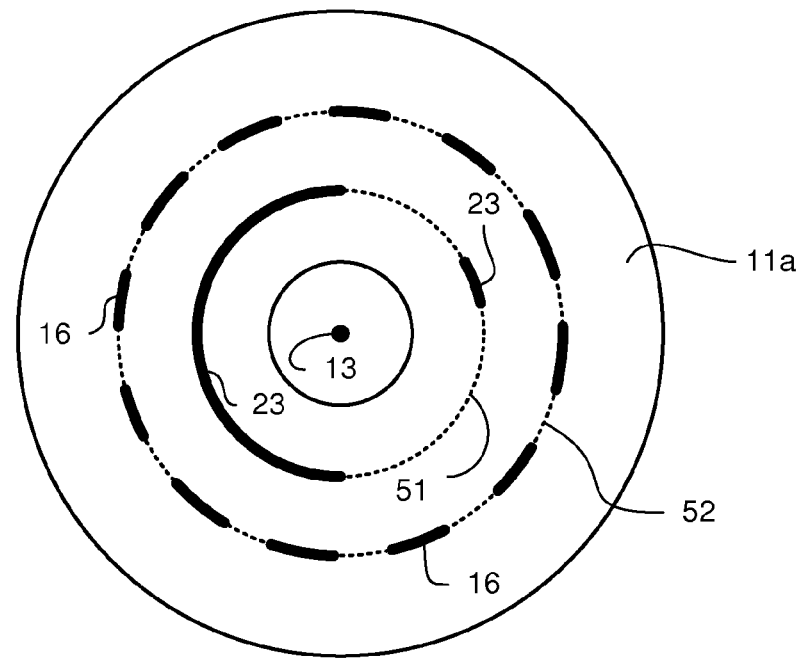
FIG. 2 depicts a portion of a particular arrangement of a rotary timing valve according to the present invention.
Figure 3:
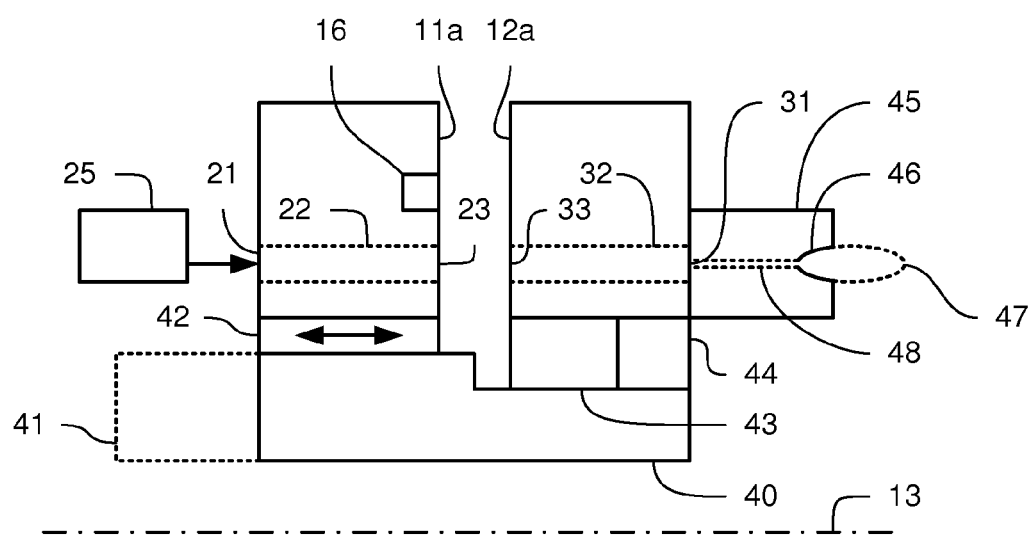
FIG. 3 depicts further detail of a rotary timing valve such as that depicted in FIG. 2.

FIGS. 2 and 3 depict parts of a particular arrangement of a rotary timing valve according to the present invention. FIG. 2 depicts, in plan view, a first surface 11a that is part of the rotary timing valve and FIG. 3 depicts in cross-section a portion of the first surface 11a and a corresponding portion of a second surface 12a that is adjacent to the first surface 11a.

As shown in FIG. 2, the first and second surfaces have an annular shape and are centered on an axis 13 that is perpendicular to the surfaces 11a, 12a and which corresponds to the axis 13 of rotation of the second surface 12a relative to the first surface 11a.

The first surface 11a includes a plurality of openings 23 that are connected by a passage 22 for fluid flow to one or more inlet ports 21. The second surface 12a includes a plurality of openings 33 that are connected by a passage 32 for fluid flow to a plurality of outlet ports 31. As shown in FIG. 2, the openings 23 in the first surface 11a are arranged on a first ring 51 that is formed about the axis 13. The plurality of openings 33 in the second surface 12a are arranged on the second surface 12a at the same distance from the axis 13. Accordingly, as the second surface 12a rotates relative to the first surface 11 a about the axis 13, each opening 33 is periodically aligned at least partially with one of the openings 23 on the first surface.

Accordingly, during such periods, outlet ports 31, connected to the openings 33 in the second surface 12a, are connected for fluid flow to an inlet port 21 that is connected to the opening 23 in the first surface 11a that is adjacent the opening 33 in the second surface 12a.

As depicted in FIG. 2, the openings 23 in the first surface 11 a may be of different sizes. Accordingly, the portion of the duty cycle for which an outlet port 31 is connected for fluid flow to the inlet ports 21 associated with the openings 23 may be controlled. For example, if the openings 33 in the second surface are relatively small compared to the circumference of the first ring 51, then the proportion of the ring 51 for which an opening 23 extends will correspond to the portion of the duty cycle of the rotary timing valve for which each outlet port 31 is connected for fluid flow to the inlet port 21 associated with the opening 23.

In the arrangement depicted in FIG. 2 one of the openings 23 corresponds to half the circumference of the ring 51. Accordingly, each outlet port 31 may be connected for fluid flow to the corresponding inlet port 21 for approximately half the duty cycle of the rotary timing valve.

In the case of an opening 23, 33 in the first or second surface 11a, 12a that is relatively large compared to the size of the first or second surface 11a, 12a the opening may be in the form of a channel formed in the surface 11a, 12a that is connected to the associated inlet or outlet port 21, 31 by one or more passages 22, 32.

As shown in FIG. 3, the inlet port 21 may be connected to a fluid supply 25. It should be appreciated that the fluid supply 25 may provide fluid to the inlet port 21 and thence, periodically, to the outlet ports 31. Alternatively it may be an under pressure source, such as a vacuum pump, that extracts fluid from the inlet port 21 and thence, periodically, from the outlet ports.

As shown in FIGS. 2 and 3, the rotary timing valve of the arrangement depicted also includes a gas bearing including a plurality of gas bearing openings 16 that are configured to provide a flow of gas from the first surface 11a to the second surface 12a in order to maintain a separation between the first and second surfaces. Further detail of the arrangement of the gas bearing is provided below.

The particular arrangement of rotary timing valve depicted in FIGS. 2 and 3 further includes a mounting structure 40 that may be used to mount the rotary timing valve to another component 41, such as a part of the system in which the rotary timing valve is to be used. The first surface 11a may be mounted to the mounting structure 40 by means of a bearing 42 that enables the first surface 11a to move to a limited extent in a direction parallel to the axis of rotation 13 of the second surface 12a. Accordingly, the first surface 11 a may be moved in order to control the separation of the first and second surfaces 11a, 12a.

The first and second surfaces 11a, 12a may be biased towards each other, for example by a resilient member acting on the first surface 11a and/or by the connection of at least one inlet port 21 to an under-pressure source. Consequently the separation of the first and second surfaces 11a, 12a may be controlled by adjusting the bearing force provided by the gas bearing. The second surface 12a may be mounted to the mounting structure 40 by a means of a rotary bearing 43 that supports the second surface 12a and permits it to rotate about the axis of rotation 13. An actuator system 44 may also be provided in order to drive the second surface 12a at a required speed.

As explained above and as depicted in FIG. 2, the gas bearing may include a plurality of gas bearing openings 16 formed in the first surface 11a. In particular, as depicted in FIG. 2, the gas bearing openings 16 may be arranged along a second ring 52 disposed about the axis 13. In particular, each of the gas bearing openings 16 may be formed as channels in the first surface 11a following an arc of the second ring 52.

As shown, the size of each of the gas bearing openings 16 may be the same. However, this need not be the case. Likewise it should be appreciated that any number of gas bearing openings may be used. In particular, if desired, a single gas bearing opening may be provided, for example that is annular in shape. However, the division of the gas bearing into a plurality of gas bearing openings distributed about the first surface may beneficially improve the stability of the separation between the first and second surfaces 11a, 12a.

The pressure of the gas exiting the gas bearing openings 16 may be the same. Alternatively, it may be desirable for the pressure for some of the gas bearing openings 16 to be different from other of the gas bearing openings 16. For example, it may be desirable for the gas pressure of gas bearing openings 16 adjacent to openings 23 in the first surface 11a that are connected to an under-pressure source to be greater than the gas pressure in the gas bearing openings 16 that are adjacent to openings 23 in the first surface 11a that are connected to a positive pressure fluid supply or gas bearing openings 16 that are not adjacent to an opening 23 in the first surface that is connected to an inlet port 47.

In the event that it is desirable to provide different gas pressures to the gas bearing openings 16 separate gas supplies may be connected to the gas bearing openings that are to have different pressures and/or valves may be provided in order to adjust the pressure at each of the gas bearing openings.

It will be appreciated that, in any case, it may be desirable to provide an adjustable valve that is associated with each of the gas bearing openings in order to permit fine tuning of the rotary timing valve during setting up of a system using a rotary timing valve according to the present invention. The adjustable valves may, for example, be pressure regulators. These may ensure that the pressure supply to the gas bearing is consistent and does not fluctuate depending on supply variations.

Alternatively or additionally, it may be desirable to provide a system in which the gas pressure in the gas bearing opening 16 can be adjusted during operation of the rotary timing valve. Accordingly, a control system such as those depicted in FIGS. 4a and 4b may be used. In the system of FIG. 4a, first and second controllable-pressure gas supplies 61, 62 are provided. Gas bearing openings 16a, 16b that are to have a first gas pressure are connected to the first controllable pressure gas supply 61 and gas bearing openings 16c, 16d, 16e that are to have an independently controllable second gas pressure are connected to the second controllable-pressure gas supply 62. Both controllable-pressure gas supplies 61, 62 may be connected to a controller 63.

Alternatively, a shown in FIG. 4b, a single gas supply 65 may supply all of the gas bearing openings. However, a first set of gas bearing openings 16a, 16b may be connected to a first pressure control valve 66 and a second set of gas bearing openings 16c, 16d, 16e, which are to have an independently controlled pressure, may be connected to a second pressure controllable valve 67. In this case, the controller 63 may control the operation of the pressure control valves 66, 67 in order to control the pressure in the gas bearing openings 16.

It will be appreciated that the controller 63 may perform various other functions, for example monitoring the speed of rotation of the second surface 12a and controlling the actuator 44 in order to provide a required rotational speed, monitoring the separation of the first and second surfaces 11a, 12a and adjusting the operation of the gas bearing, if required, in order to maintain the desired separation.

Regardless of whether a control system is used or, in that case, the nature of the control system used to control the gas bearing, it may be desirable to provide a gas flow restrictor 68 to each of the gas bearing openings 16. Such a gas flow restrictor may be arranged to restrict the flow of gas from the gas bearing openings 16 according to the gas pressure. This may be simply provided by a throttle at the point at which a gas supply line opens into the gas bearing openings 16.

The use of a gas flow restrictor may further improve the stability of the control of the separation between the first and second surfaces 11a, 12a. In particular, as the separation between the surfaces increases, the gas flow rate rises, increasing the pressure drop across the restrictor. In turn, this reduces the pressure acting between the surfaces, causing the separation to reduce. It should be appreciated that the setting of the gas flow restrictors may be used in controlling the gas bearing and its response to load variations. It will further be appreciated that different restrictor sizes may be used for gas bearing openings in different locations, especially if loading of the gas bearing is different in different locations. This may occur, for example, as a result of variations in the geometry of the openings on the first and second surfaces and their connections to different sources.

The dynamic stability of rotation of the two surfaces may be a significant factor in the design of a rotary supply joint or rotary timing valve according to the present invention. In particular, if sufficient stability is not provided, the speed of rotation of the two surfaces may need to be limited which, depending on its use, may not be satisfactory.

In general, the gas bearing openings should be arranged to distribute the gas pressure to the air bearing surface without giving rise to dynamic stability. The gas present in the bearing is compressible and can allow a situation to arise in which one part oscillates relative to the second. This is known as air hammer.

In order to maximize stability of the two surfaces, the gas flow restrictor may be arranged to close as possible to the gas bearing openings, minimizing the volume of gas in the space between the gas flow restrictor and the opening.

The dynamic stability may also be increased by minimizing the separation between the two surfaces. This may increasing the effective area as discussed above. Furthermore, when the two surfaces are close together, a thin gas film may be trapped, providing strong damping of the relative motion of the surfaces. It will be appreciated that such damping will increase the stability. However, the smaller the separation between the two surfaces, the higher the required manufacturing tolerances for the two surfaces, increasing the cost of production of the rotary supply joint or supply timing valve and increasing the cost of maintenance.

The shape, arrangement and layout of the gas bearing openings may also affect the stability of the rotation. For example, arranging the gas bearing openings further away from the axis of rotation of the second surface relative to the first surface may increase stability. Likewise, using a larger number of gas bearing openings that are smaller in size may also increase the stability. Accordingly, it may be necessary to balance the cost of providing a greater number of gas bearing openings with the cost of machining the first and second surfaces to a relatively high tolerance such that the separation between them in use may be reduced.

As depicted in FIG. 2, the second ring 52 on which the gas bearing openings 16 may be located further from the axis of rotation 13 than the first ring 51 on which the openings 23 in the first surface are located, maximizing the distance of the gas bearing openings from the axis of rotation. However, this may be reversed. Furthermore, both the gas bearing openings and the openings in the first surface 11a that are connected to the inlet ports 21 may be arranged on more than one ring surrounding the axis 13.

Regardless of the configuration of the rotary supply joint or the rotary timing valve, it may be used in a variety of circumstances. In particular, it may be used in a product handling apparatus. In the manufacture of many products, the automation of a variety of processes can be used to ensure that production costs are kept to a minimum. Likewise, the automation of transfer processes can also be used to ensure that costs are minimized. Accordingly, the arrangement of product handling apparatus, for example for handling products during manufacture, transport, testing and/or inspection may be an important part of a production system. As shown in FIG. 3, a rotary supply joint or a rotary timing valve according to the present invention may be used in the formation of a product handling apparatus.

For example, a product holder 45 may be mounted to one or more or all of the outlet ports 31. Accordingly, the product holder 45 may be at least periodically connected for fluid flow to the one or more inlet ports 21. In particular, therefore, if an inlet port 21 is connected to an under-pressure source, the product holder 45 is, correspondingly, periodically connected for fluid flow to the under-pressure source.

The product holder 45 may include a receiving portion 46 having a shape corresponding to at least a portion of a product 47. A channel 48 may be provided between the product receiving portion 46 and the outlet port 31. Accordingly, when the outlet port is connected to the under-pressure source by means of the rotary supply joint or rotary timing valve, the product 47 may be secured by the under-pressure to the product receiving portion 46.

It will be appreciated that such an arrangement may be used in a variety of situations. For example, in an arrangement using a rotary supply joint, the product holder 45 may be continuously connected for fluid flow to the under-pressure source. Accordingly, the product 47 may be held securely in the product receiving portion 46 until it is physically removed from the product receiving portion.

Alternatively or additionally, the product holder 45 may be used in conjunction with a rotary timing valve in which, for a given portion of the duty cycle, the product holder 45 is connected for fluid flow to an under-pressure source. In this case, the product 47 is secured in the product receiving portion. However, the product holder 44 may not connected for fluid flow to the under-pressure source for another part of the duty cycle. In that case, the product 47 may fall away from the product receiving portion 46 during that portion of the duty cycle.

In a further variation, during a further part of the duty cycle, the product holder 45 may be connected for fluid flow to a different inlet port, connected to a positive pressure supply. The positive pressure may, for example, be used to actively expel the product 47 from the product receiving portion 46. Alternatively, however, the product handling apparatus may be configured such that, before the product handler 45 is connected to the positive pressure source, the product 47 falls away from the product receiving portion 46. In that case, the positive pressure source may be used to provide a flow of gas, or other fluid, to the product holder 45 in order to remove any debris that may remain, for example in the product receiving portion 46.

In a particular arrangement, the product handler 45 may be configured to rotate relative to the second surface, at least while holding the product 47 in the product receiving portion 46. Such an arrangement may permit the provision of an inspection system that inspects substantially all of the product 47 that extends from the product receiving portion 46.

It will be appreciated that product handling apparatus such as that discussed above may be provided for a variety of different products. For example, product handling apparatus such as that discussed above may be provided to handle pharmaceutical products such as pills and capsules.

The invention claimed is:

1. A product handling apparatus, comprising a rotary supply joint having one or more outlet ports and one or more inlet ports configured to provide a connection for fluid flow between the one or more outlet ports and the one or more inlet ports, the rotary supply joint including:

first and second surfaces, configured to rotate relative to each other and to have corresponding shapes such that, during relative rotation of the first and second surfaces, a substantially constant separation may be maintained between the first and second surfaces;

wherein each of said one or more inlet ports is connected for fluid flow to at least one opening on the first surface;

each of said one or more outlet ports is connected for fluid flow to at least one opening on the second surface; and as the first and second surfaces rotate relative to each other, at least one opening on the first surface is at least periodically at least partially aligned with at least one opening on the second surface, permitting a flow of fluid from one to the other;

a gas bearing, provided between the first and second surfaces, configured to provide a bearing force between the first and second surfaces; and an under-pressure source connected to said at least one inlet port;

the product handling apparatus further comprising at least one product holder, mounted to the second surface and connected for fluid flow to one of said one or more outlet ports;

wherein the rotary supply joint is configured such that said outlet port is at least periodically connected for fluid flow to said at least one inlet port such that the product holder is at least periodically connected for fluid flow to said under-pressure source, and wherein the product holder is configured to rotate relative to the second surface at least while holding a product in a product receiving portion of the product holder.

2. The product handling apparatus according to claim 1, wherein the gas bearing is configured to provide a force between the two surfaces that compensates for the net force exerted on the surfaces to draw them together that is generated when said at least one of the inlet ports is connected to an under-pressure source.

3. The product handling apparatus according to claim 1, wherein the product is a pharmaceutical product selected from pills and capsules.

4. The product handling apparatus according to claim 1, wherein said gas bearing includes one or more gas bearing openings on at least one of the first and second surfaces, that may be connected to a supply of gas at a pressure that is higher than the ambient pressure of the environment in which the rotary timing valve is used in order to provide a bearing flow of gas from said gas bearing openings.

5. The product handling apparatus according to claim 4, wherein said gas bearing includes a plurality of gas bearing openings, and gas is supplied to at least two of said gas bearing openings such that the gas pressure in each may be independently controlled.

6. The product handling apparatus according to claim 4, wherein said gas bearing is configured such that each of said gas bearing openings is associated with a respective gas flow restrictor.

7. The product handling apparatus according to claim 4, wherein said one or more gas bearing openings are provided on said first surface.

8. The product handling apparatus according to claim 7, wherein said one or more gas bearing openings are provided along a first ring surrounding the axis of rotation of the second surface.

9. The product handling apparatus according to claim 8, wherein at least one said gas bearing opening is configured in the form of a channel along at least part of said first ring.

10. The product handling apparatus according to claim 8, wherein said at least one opening on the first surface, that is connected for fluid flow to said at least one inlet port, is provided along a second ring surrounding the axis of rotation of the second surface.

11. The product handling apparatus according to claim 10, wherein said second ring is provided closer to the axis of rotation of the second surface than the first ring, provided with the one or more gas bearing openings.

\* \* \* \* \*